3,125,585
PREPARATION OF BICYCLO-(2,2,2)-OCT-7-
ENE - 2,3,5,6 - TETRACARBOXYLIC ACID
DIANHYDRIDE
William F. Yates, Dickinson, Tex., assignor to Monsanto
Chemical Company, St. Louis, Mo., a corporation of
Delaware
No Drawing. Filed Mar. 20, 1962, Ser. No. 181,176
2 Claims. (Cl. 260—346.3)

The present invention relates to a new compound, bicyclo-(2,2,2)-oct-7-ene-2,3,5,6-tetracarboxylic acid dianhydride, corresponding to the formula

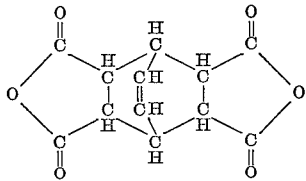

It is known that the trans isomer of 1-chlorobutadiene will react mole for mole with maleic anhydride to form the Diels-Alder reaction product, 3-chloro-$\Delta^4$-cyclohexene-1,2-dicarboxylic anhydride. It has now been discovered that if two moles of maleic anhydride are reacted with a mole of trans 1-chlorobutadiene at elevated temperatures, the compound bicyclo-(2,2,2)-oct-7-ene-2,3,5,6-tetracarboxylic acid dianhydride, the formula for which appears above, is produced. This product when reacted with ethylene glycol gives a clear viscous polyester resin highly useful in certain applications such as in the preparation of surface coatings or of plastic construction materials of the type made from polyester resins reinforced with fiber glass.

The preparation of the new compound of the invention is illustrated in the following examples.

*Example 1*

To a round-bottomed flask fitted with a thermometer, a stirrer and a cold-water condenser were charged 107 g. of a crude 1-chlorobutadiene prepared by cracking 1,4-dichlorobutene and containing approximately 65% of the trans isomer (0.78 mole) and 168 g. maleic anhydride (2 moles+10% excess). The contents of the flask were heated to initiate reaction with the temperature being maintained thereafter at about 50–60° C. by cooling until all exothermic reaction was complete (about 2 hr.). Unreacted cis 1-chlorobutadiene was distilled out (38.5 g. recovered as vs. 37.5 g. theoretical). The cold-water condenser was replaced with an air condenser and the remaining reaction mixture was heated to 200° C. and maintained at that temperature until HCl evolution was complete and crystal formation was at a maximum (about 4 hr.). The reaction mixture was cooled, about 200 ml. of acetone was added to it and the resulting slurry was heated under reflux conditions for one hour after which it was filtered. The precipitate was reslurried with acetone and filtered two more times before it was finally dried. About 87 g., representing a yield of 45% of the theoretical possible, of a slightly off-white crystalline product was obtained which was insoluble in acetone and was identified by its infrared spectrum as bicyclo - (2,2,2)-oct-7-ene-2,3,5,6-tetracarboxylic acid dianhydride. Results of a carbon-hydrogen analysis were as follows:

| | Percent C | Percent H | Percent O (by difference) |
|---|---|---|---|
| Found | 58.03 | 3.31 | 38.66 |
| Calculated | 58.1 | 3.23 | 38.67 |

*Example 2*

Approximately 708 g. of the 1-chlorobutadiene used in Example 1 containing about 4 moles of the trans isomer was refluxed at about 80° C. with 862 g. (8 moles+10% excess) of maleic anhydride for about 45 minutes. Excess cis 1-chlorobutadiene was stripped from the reaction mixture. The mixture was then heated rapidly to about 110–160° C. until all HCl evolution ceased after which the temperature was raised and maintained at 200–220° C. until no further refluxing of maleic anhydride occurred (about 30–45 minutes). The reaction mixture was cooled, slurried with acetone, filtered, reslurried with acetone and filtered again as in Example 1. The precipitated product in a yield of about 50% of the theoretical possible was dried and recrystallized from technical grade dimethylformamide. The recrystallized product positively identified by its infrared spectrum as pure bicyclo-(2,2,2)-oct-7-ene-2,3,5,6-tetracarboxylic acid dianhydride was a fine white powder.

The bicyclo-(2,2,2)-oct-7-ene-2,3,5,6-tetracarboxylic dianhydride was readily converted to a clear viscous polyester by heating it with 4 parts of ethylene glycol per part of the dianhydride until boiling ceased. The resulting polyester resin has many applications but is particularly useful in the preparation of surface coatings. Other alcohols can be readily substituted for the glycol used in the esterification reaction to produce equally useful resins.

Since trans 1-chlorobutadiene is presently only available in admixture with the cis isomer, this necessitates the low-temperature heating in the inital stage of the reaction and the stripping out of the cis isomer before the reaction can go to completion. If desired, the cis isomer can be distilled out of the reaction mixture during the initial heating step instead of heating under reflux conditions followed by stripping out of the unreactive isomer in a separate operation. If and when the pure trans isomer is readily available, a typical preparation of the new compound of the invention would involve the simple single step of heating a mole of trans 1-chlorobutadiene with more than one mole of maleic anhydride at a temperature in the range from about 200 to about 220° C. and maintaining the mixture in this temperature range until no further evolution of gas is apparent and all refluxing of maleic anhydride ceases. This requires generally from about 30 to about 45 minutes. Since the reaction is exothermic, cooling is required to maintain the reaction temperature. This can be accomplished in smallscale operations by the refluxing of the maleic anhydride but on a large or commercial scale external cooling would probably be required. The solid reaction product is isolated from the reaction mixture in any suitable manner. Preferably, it is washed or rinsed several times with a solvent such as acetone, benzene, toluene, xylene, and the like. The product may then be recrystallized, if desired, from a suitable solvent such as dimethylformamide.

What is claimed is:
1. The process of preparing bicyclo-(2,2,2)-oct-7-ene-2,3,5,6-tetracarboxylic acid dianhydride which comprises reacting two moles of maleic anhydride with one mole of trans 1-chlorobutadiene at a temperature of about 200° C. to about 220° C.

2. The process of preparing bicyclo-(2,2,2)-oct-7-ene-2,3,5,6-tetracarboxylic acid dianhydride which comprises heating to a temperature from about 50° to about 80° C., a mixture of trans and cis 1-chlorobutadiene with maleic anhydride in proportions such that more than one mole of maleic anhydride is present per mole of trans 1-chlorobutadiene, removing unreacted cis 1-chlorobutadiene from the reaction mixture, heating the remaining reaction mixture under reflux conditions to a temperature from about 200 to about 220° C. until no more gas is evolved and refluxing of the maleic anhydride ceases and recovering bicyclo-(2,2,2)-oct-7-ene-2,3,5,6-tetracarboxylic acid dianhydride from said reaction mixture.

References Cited in the file of this patent
FOREIGN PATENTS
747,970    Great Britain _____ Apr. 18, 1956

OTHER REFERENCES

Diels et al.: Ann. (Justus Liebig's), vol. 490 (1931), page 259.

Arbuzov et al.: Doklady Akad. Nauk S.S.S.R., vol. 65 (1949), pages 493–5 (abstracted at Chem. Abst., vol 45 (1951), col. 6164d).

Onishchenko et al.: Doklady Akad. Nauk S.S.S.R., vol. 132, No. 1, (May 1960), pages 138–40 (abstracted at Chem. Abst., vol. 54 (1960), col. 20916).